United States Patent [19]

Matsumura et al.

[11] Patent Number: 4,667,079
[45] Date of Patent: May 19, 1987

[54] ELECTRODE RETRACTION CONTROL SYSTEM OF ELECTRIC DISCHARGE MACHINE

[75] Inventors: Teruyuki Matsumura, Hachioji; Masashi Yukutomo, Sagamihara, both of Japan

[73] Assignee: Fanuc Ltd., Minamitsuru, Japan

[21] Appl. No.: 705,426

[22] PCT Filed: Jun. 8, 1984

[86] PCT No.: PCT/JP84/00297
 § 371 Date: Feb. 8, 1985
 § 102(e) Date: Feb. 8, 1985

[87] PCT Pub. No.: WO84/04895
 PCT Pub. Date: Dec. 20, 1984

[30] Foreign Application Priority Data

Jun. 8, 1983 [JP] Japan ................................ 58-102232

[51] Int. Cl.⁴ .......................... B23H 1/02; B23H 7/18
[52] U.S. Cl. .................... 219/69 G; 219/69 C
[58] Field of Search ............. 219/69 G, 69 S, 69 C

[56] References Cited

U.S. PATENT DOCUMENTS

| | | | |
|---|---|---|---|
| 2,901,588 | 8/1959 | McKechnie | 219/69 G |
| 3,318,793 | 5/1967 | Webb | 219/69 G |
| 3,370,147 | 2/1968 | Matulaitis | 219/69 G |
| 3,435,176 | 3/1969 | Lobur | 219/69 G |
| 3,435,177 | 3/1969 | Lobur | 219/69 G |
| 3,510,620 | 5/1970 | Smith | 219/69 G |
| 3,525,843 | 8/1970 | Batterson | 219/69 G |
| 3,531,615 | 9/1970 | Zammit | 219/69 G |
| 3,558,844 | 1/1971 | Lobur | 219/69 G |
| 3,721,795 | 3/1973 | Lobur | 219/69 G |
| 3,781,507 | 12/1973 | Inoue | 219/69 G |
| 3,843,864 | 10/1974 | Wohlabaugh | 219/69 G |
| 4,152,569 | 5/1979 | Bell, Jr. et al. | 219/69 G |
| 4,338,504 | 7/1982 | Gray | 219/69 G |
| 4,365,300 | 12/1982 | Johanson et al. | 219/69 G |
| 4,367,400 | 1/1983 | Otto et al. | 219/69 G |
| 4,514,611 | 4/1985 | Matsui et al. | 219/69 G |

FOREIGN PATENT DOCUMENTS

| | | | |
|---|---|---|---|
| 55-24864 | 2/1980 | Japan | 219/69 G |
| 748544 | 4/1952 | United Kingdom | 219/69 G |

OTHER PUBLICATIONS

"Micro Computer Controlled Spark Erosion", EDM Digest, 09/1980 by Heuvelman et al.

Primary Examiner—A. D. Pellinen
Assistant Examiner—Geoffrey S. Evans
Attorney, Agent, or Firm—Staas & Halsey

[57] ABSTRACT

An electrode retraction control system of an electric discharge machine for rapidly retracting an electrode from a workpiece, in which the retraction velocity and readvance velocity of an electrode (EP) moving relative to a workpiece (WK) are set to a velocity obtained by multiplying, by a fixed multiplication factor (a, k), a velocity decided on the basis of a gap sensing voltage (Vd) corresponding to the magnitude of a gap between the workpiece (WK) and the electrode (EP), the velocity being held constant during retraction and readvance. Machining efficiency is advanced by raising the retraction velocity and readvance velocity of the electrode (EP).

6 Claims, 6 Drawing Figures

ELECTRODE RETRACTION CONTROL SYSTEM OF ELECTRIC DISCHARGE MACHINE

BACKGROUND OF THE INVENTION

This invention relates to an electrode retraction control system for controlling the retraction of an electrode in an electric discharge machine for subjecting a workpiece to electric discharge machining by impressing a machining voltage across the workpiece and an electrode travelling relative thereto.

Electric discharge machines include wire-cut electric discharge machines wherein a wire electrode is moved relative to a workpiece so as to be guided along a commanded path, thereby to perform electric discharge machining; and electric discharge machines wherein an electrode of a prescribed shape, held close to the surface of a workpiece, is moved into the workpiece to perform cutting and an electric discharge is produced across the electrode and the workpiece, thereby to subject the workpiece to machining in conformance with the shape of the electrode.

Figure 1:
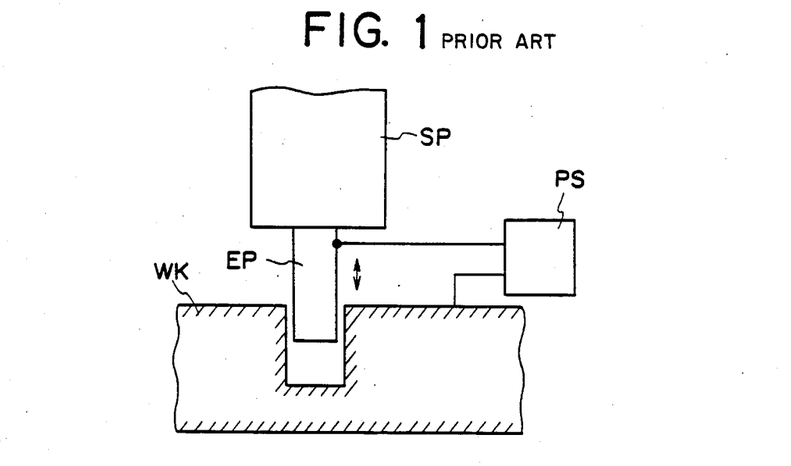
FIG. 1 schematically illustrates an electric discharge machine.

FIG. 1 illustrates schematically the latter electric discharge machine. In FIG. 1, an electrode EP acting as a punch is supported by a spindle SP and is fed for machining in the direction of the arrow by a servomotor, not shown. It is so arranged that a workpiece WK to be formed into a die and the electrode EP are dipped into a machining fluid and a square-wave voltage from a power source PS is applied across them. By advancing the electrode EP for machining while a spark discharge is produced across a minute gap between the electrode EP and the workpiece WK, the workpiece WK is subjected to machining in conformance with the shape of the electrode EP. The workpiece WK can be machined to have an enlarged bore of dimensions commensurate with the shape and amount of energy of the voltage pulses impressed across the electrode EP and the workpiece. When necessary an enlarged bore of desired size can be machined in the workpiece WK by moving the electrode EP in eccentric fashion.

In order to produce a satisfactory discharge across the electrode EP and workpiece WK, it is necessary that the gap between them be held constant at all times.

To this end, the prior-art practice is to use a synchronous feed system in which a voltage separate from the aforementioned machining voltage of square-wave shape is applied for sensing the gap between the electrode EP and workpiece WK, and the advance and retraction of the electrode EP are controlled automatically in accordance with a change in the gap sensing voltage, which corresponds to a change in the gap.

Figure 2:
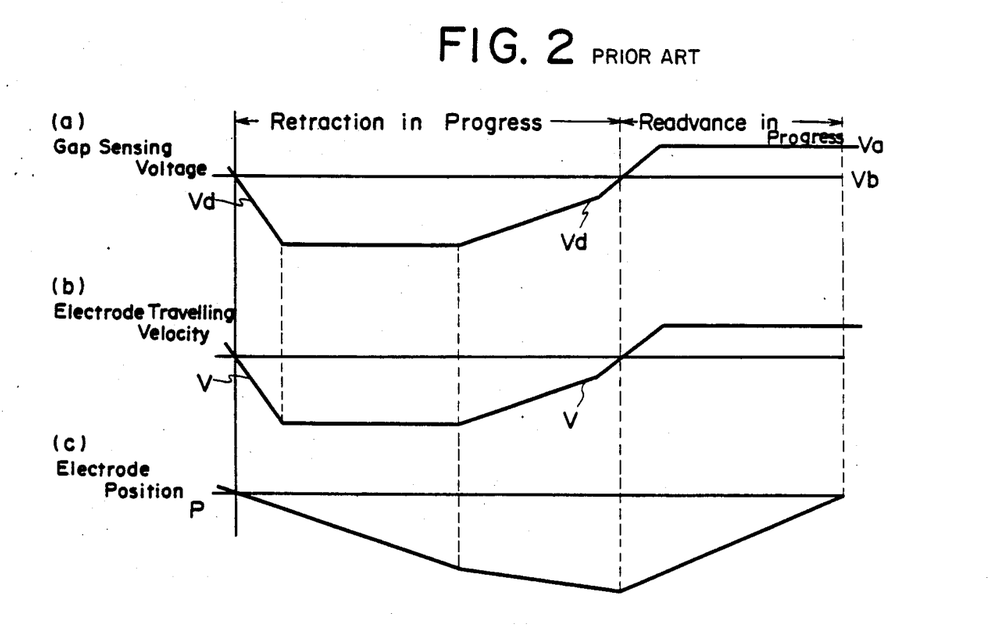
FIG. 2 are timing diagrams for an electrode retraction control system according to the prior art.

FIG. 2 is a view for describing this conventional synchronous feed system and illustrates a case where retraction is controlled.

When the electrode EP nears workpiece WK to form a gap in excess of a predetermined size, a gap sensing voltage Vd falls below a voltage Va that prevails when conditions are normal. If the gap sensing voltage Vd falls further and drops below a limit voltage Vb, the electrode EP is retracted relative to the workpiece WK. The travelling velocity of the electrode EP at this time is proportional to the gap sensing voltage Vd, as shown in FIGS. 2(a), (b).

When the gap between the electrode EP and workpiece WK is widened by retraction of the electrode EP to bring about a corresponding increase in the gap sensing voltage Vd, the voltage Vd eventually returns to the limit voltage Vb, retraction of the electrode EP is halted. This is followed by resumption of electrode advance. The velocity v during advance also is proportional to the gap sensing voltage Vd. When an advance velocity deceleration point is reached, the advance velocity v is reduced and again attempts to return to the point at which retraction starts. Such electrode retraction control is executed in accordance with a fixed sequence.

According to this conventional electrode retraction control system, however, a quick retraction operation cannot be achieved because the retraction velocity is dependent upon the gap sensing voltage. A result is continuation of an arc discharge that follows the spark discharge, causing the electrode EP and workpiece WK to collide in extreme cases. A problem that results is a deterioration in the precision to which the surface of the workpiece WK is machined. An additional problem is a reduction in the speed at which the workpiece WK is machined, this being ascribable to the excessive amount of time needed to exercise retraction control.

Summary of the Invention

An object of the present invention is to provide an electrode retraction system of a discharge machine tool, whereby electrode retraction control is performed in prompt fashion to prevent continuation of arc discharge as well as collision between the electrode and workpiece, thereby raising machining speed and machining accuracy.

To this end, according to the present invention, a velocity obtained by multiplying a velocity, which is determined from an electrode-workpiece gap sensing voltage by a fixed multiplication factor is used as the retraction velocity and readvance velocity of the electrode relative to the workpiece, and these velocities are maintained at a value obtained by multiplying a velocity, which is decided on the basis of the minimum gap sensing voltage multiplied by a fixed multiplication factor. More specifically, the aforementioned retraction velocity and advance velocity are taken as a velocity obtained by multiplying a velocity, which is determined from the gap sensing voltage multiplied by a fixed multiplication factor, and are maintained at a maximum retraction velocity in dependence upon the minimum gap sensing voltage. This makes it possible to prevent an arc discharge across the electrode and workpiece as well as collision between the electrode and workpiece, thereby preventing a decline in machined surface precision. Furthermore, shortening retraction control time enables a corresponding increase in machining speed to be achieved.

DETAILED DESCRIPTION OF THE PREFERRED EMBODIMENT

The present invention will now be described in conjunction with the accompanying drawings to set forth the invention in greater detail.

Figure 3:
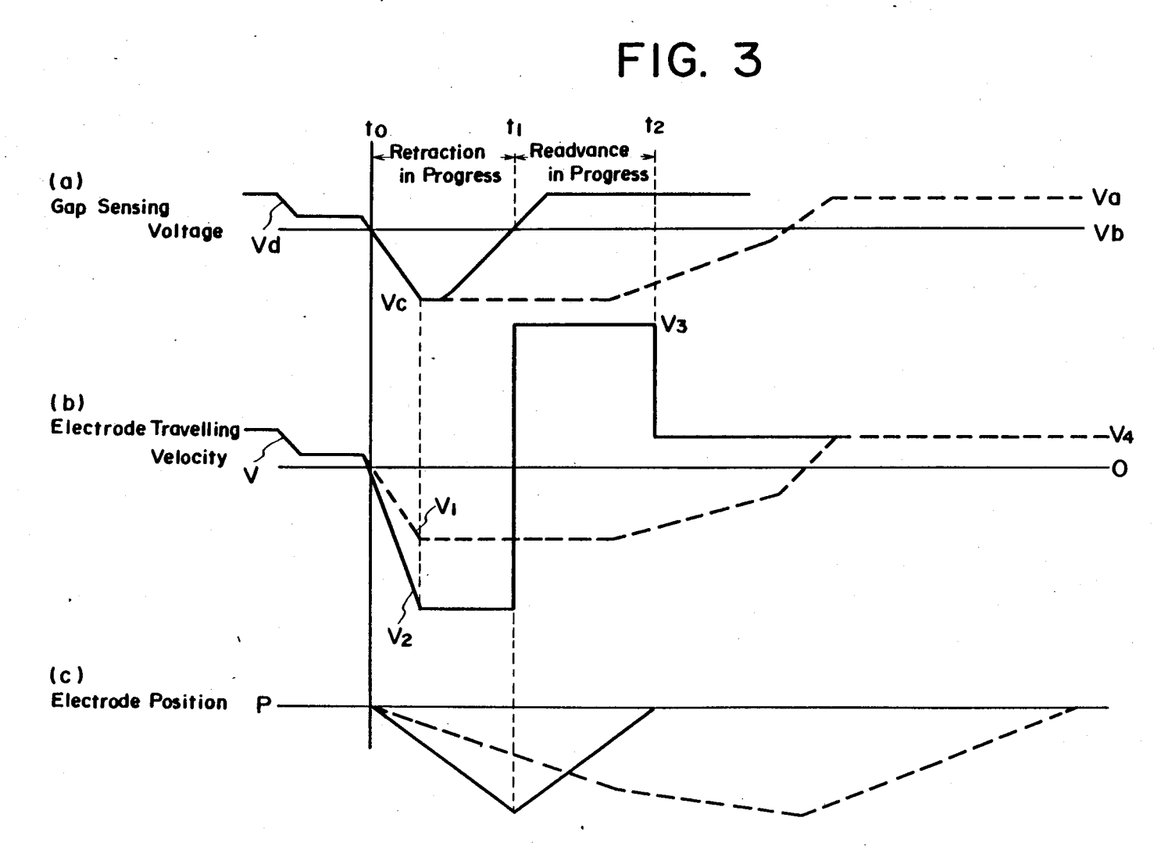
FIG. 3 illustrates timing diagrams for the present invention.

Referring to FIG. 3, in an electric discharge machine of the kind shown in FIG. 1, both the gap sensing voltage Vd and electrode travelling velocity V decline as the gap between the electrode EP and workpiece WK becomes small. As for the relation between the electrode travelling velocity v and gap sensing voltage Vd, if we let the prior-art relation for both advance velocity and retraction velocity be given by the following:

$$v1 = k(Vd - Vb) \qquad (1)$$

then, according to the present invention, advance velocity is unchanged but retraction velocity and readvance velocity are expressed as follows:

$$v2 = a \cdot k \cdot Vc \qquad (2)$$

where k, a are constants of proportion, $a > 1$ and $V_c = \text{MAX}(Vd - Vb)$.

Accordingly, when the gap sensing voltage Vd has a minimum voltage value Vc, the retraction velocity v2 takes on a maximum value so that the electrode EP is retracted at a rapid rate.

When the electrode EP is retracted in this manner, the gap sensing voltage Vd rises. The voltage retraction velocity, however, rather than becoming small in proportion to the gap sensing voltage Vd as in the prior art, is held at a level corresponding to the retraction velocity v2 set by the minimum value Vc of the gap sensing voltage Vd. Therefore, as seen from the retraction velocity v, the gap sensing voltage Vd is clamped to the minimum voltage value Vc. The electrode EP is thus retracted at a rapid rate.

In consequence, the gap sensing voltage Vd rises rapidly and arrives at the limit voltage value Vb at a time $t_1$. When this occurs, retraction of the electrode EP is suspended and the electrode is immediately readvanced. The readvance velocity at this time has a value v3, which is the same as the retraction velocity value v2, and is therefore not proportional to the gap sensing voltage Vd as in the prior art. As a result, the electrode EP is readvanced at a rapid rate.

When the electrode EP is thus readvanced, and a predetermined advance velocity deceleration point (time $t_2$) is reached, the electrode is advanced from this point onward at a travelling velocity v4 decided by Eq. (1) using the gap sensing voltage Vd.

Accordingly, in comparison with the conventional control system illustrated by the dashed line in FIG. 3, the present invention makes it possible to greatly curtail retraction control operating time, as indicated by the solid line in FIG. 3.

Figure 4:
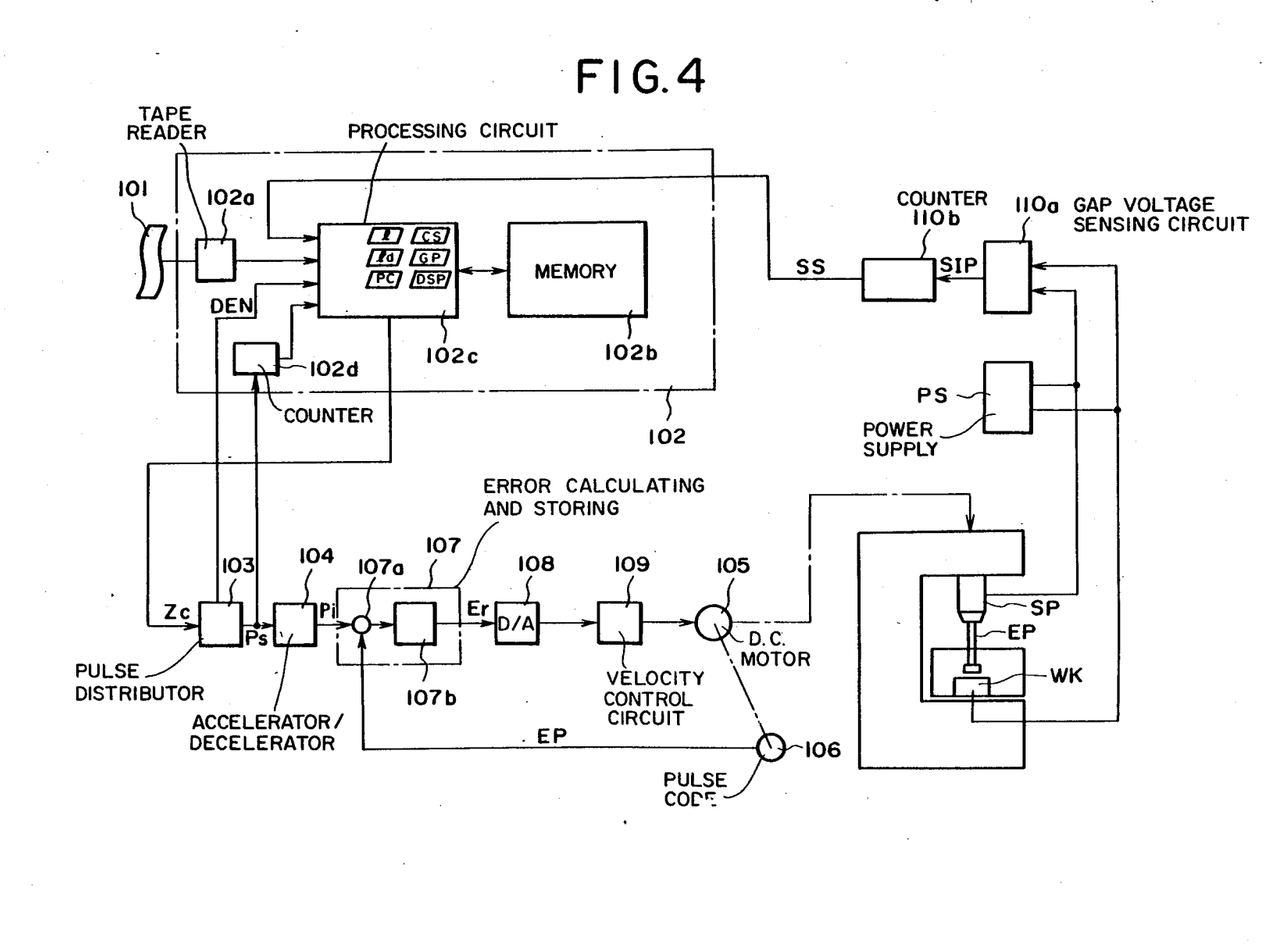
FIG. 4 is a block diagram of electrode retraction control according to the present invention.

FIG. 4 is a block diagram of a retraction control system according to the present invention. Portions similar to those shown in FIG. 1 are designated by like reference characters.

In the Figure, numeral 101 denotes an NC (numerical control) tape bearing punched NC command information for numerically controlling an electric discharge machine. The NC command information include (A) ordinary numerical information indicative of the kind of shape to be machined, (B) velocity information indicating the advance velocity at which machining is to be performed, (C) auxiliary function instructions, etc., to be delivered to the machine side, and, in addition, (D) a plurality of retraction conditions (retraction control information) indicating how retraction control is to be performed.

Numeral 102 denotes a processing unit having a paper tape reader 102a, a memory 102b for storing the NC command information and the like, a processing circuit 102c constructed of a microcomputer for executing position control and retraction control of the electric discharge machine, and a current position counter 102d for reversibly counting distributed pluses, described below, in dependence upon travelling direction. The processing circuit 102c decodes input information and delivers, e.g., M, S and T function instructions to the machine side through a magnetics unit and a move control Zc to a pulse distributor, which is the next stage. Numeral 103 denotes the pulse distributor, which executes well-known pulse distribution computations on the basis of the move command Zc and generates distributed pulses $P_s$ at a frequency corresponding to a commanded velocity. Numeral 104 designates a known accelerator/decelerator circuit which generates a train of pulses Pi by rectilinearly accelerating the pulse rate of the train of distributed pulses Ps at the occurrence of this pulse train and rectilinearly decelerating the same at the end thereof. Numeral 105 indicates a DC motor by which the electrode EP is fed for machining. Numeral 106 denotes a pulse coder which generates one feedback pulse FP each time the DC motor rotates by a predetermined amount. Numeral 107 denotes an error calculating and storing unit constituted by, e.g., a reversible counter, and which stores a difference Er between the number of input pulses Pi generated by the accelerator/decelerator circuit 104 and the number of feedback pulses FP. The error calculating and storing unit 107 may be constructed, as shown, of an arithmetic circuit 107a for calculating the difference Er between Pi and FP, and an error register 107b for storing Er. More specifically, assuming that the DC motor 105 is rotating in the forward direction, the error calculating and storing unit 107 counts up the input pulses Pi each time one is generated and counts down the feedback pulses EP each time one is generated, the difference Er between the number of input pulses and feedback pulses being stored in the error register 107b. Numeral 108 denotes a DA converter for generating an analog voltage proportional to the content of the error register 107b, and numeral 109 a velocity control circuit.

Numeral 110a designates a gap voltage sensing circuit for sensing the gap sensing voltage Vd from a voltage applied across the electrode EP and workpiece Wk by the power supply PS, and for producing gap pulses SIP at a frequency proportional to the magnitude of a sensed value (Vd − Vb). Numeral 110b denotes a counter for counting the gap pulses SIP from the gap volage sensing circuit 110a.

Figure 5:
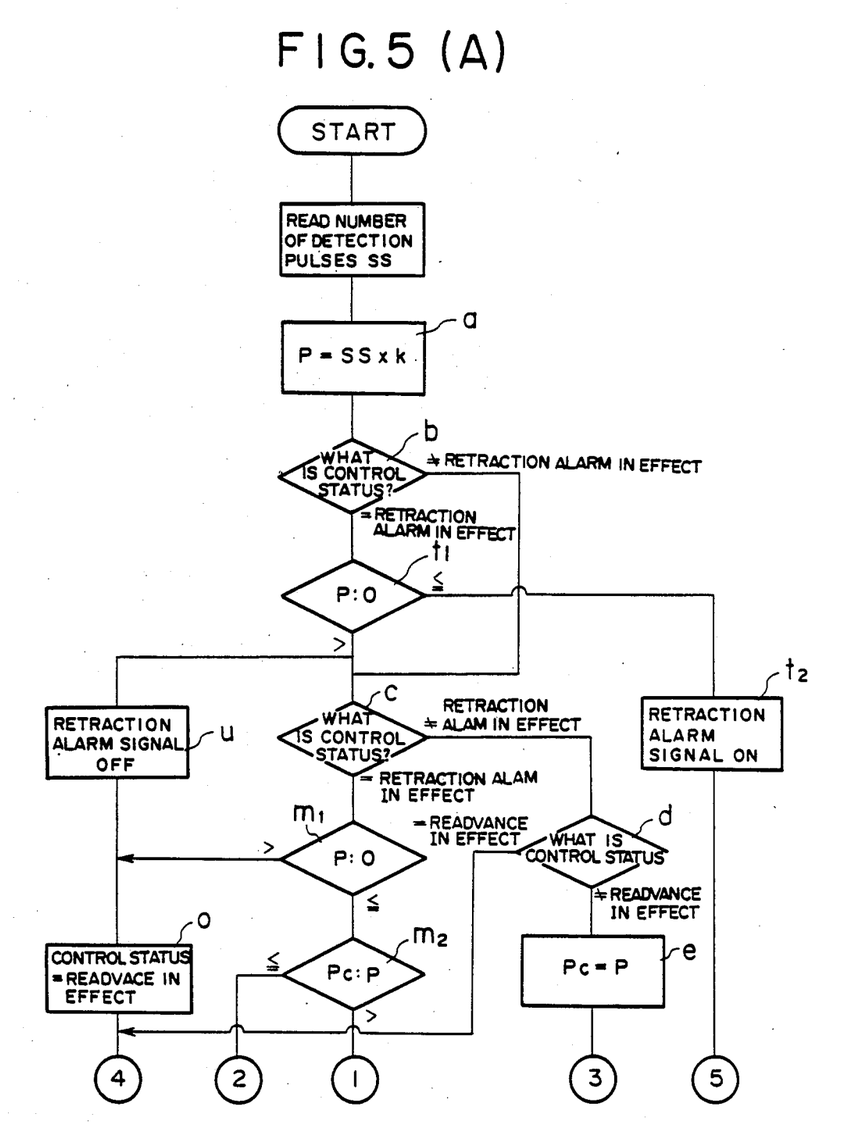
FIGS. 5A and 5B are flowcharts for the processing of the present invention.
Figure 5B:
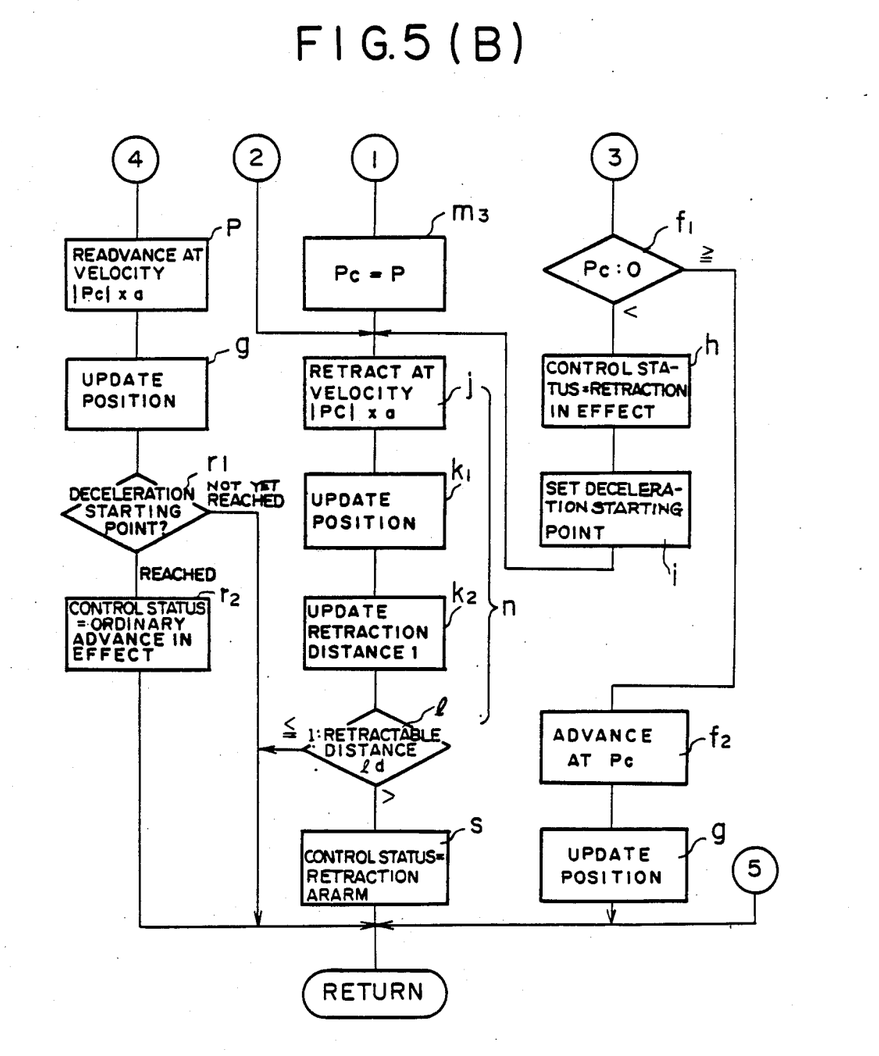

The operation of the arrangement of FIG. 4 will now be described in conjunction with the processing flowchart of FIG. 5. We will assume that the electrode EP is being fed for machining, and that discharge machining is taking place between the electrode EP and workpiece WK.

Since the power supply PS is impressing a voltage across the electrode EP and workpiece WK, the gap voltage sensing circuit 110a produces the gap pulses SIP of a frequency proportional to the value sensed. These pulses are counted by the counter 110b.

The processing unit 102c reads the value in the counter 110b periodically and resets the counter 110b whenever the value is read. The value in counter 110b is zero when the gap sensing voltage Vd is equal to the limit value Vb, positive when Vd>Vb holds, and negative when Vd<Vb holds.

In step (a) the processing unit 102c reads the value SS in counter 110b and calculates a velocity P in accordance with Eq. (1). Specifically, the velocity P is calculated in accordance with the following equation, obtained by transforming Eq. (1):

$$P = k \cdot SS \tag{1}'$$

In the relation between the gap sensing voltage Vd and limit value Vb, P>0 will hold where Vd>Vb does, and P<0 will hold where Vd<Vb.

In step (b) the processing unit 102c investigates the currently prevailing control status. Since the currently prevailing control status CS will have been stored in the memory 102b, the processing unit 102c reads the control status CS out of the memory 102b and identifies the same. Since an alarm generated when a predetermined retraction limit distance is surpassed during retraction control is not set as the control status CS during the aforementioned machining feed (advance), the processing unit 102c renders a decision to the effect that the control statuc CS is not the retraction alarm.

In step (c) next, the procesing unit 102c determines whether the control status CS stored in the memory 102b indicates that retraction is in progress.

In step (d) let us assume here that machining feed is in progress. In such case, the control status CS is not indicative of retraction, so that the processing unit 102c determines whether the control status CS indicates that readvance is in progress.

In step (e) since machining feed will be in effect, the control status will not indicate readvance. Hence, the processing unit 102c sets the velocity P calculated at step (a) in the memory 102b as a commanded velocity Pc.

In step (f) the processing unit 102c then determines whether the commanded velocity Pc is positive or negative (f1). If Pc is positive, namely if the gap voltage is equal to or greater than the limit value Vb (i.e., when the gap between the electrode EP and workpice WK is of a predetermined magnitude), this is indicative of a normal state and, hence, the commanded velocity Pc is sent to a pulse distributor 103 to advance the electrode EP (i.e., to feed the electrode) for machining) (step f2) in a manner described below.

In step (g) the processing unit 102c reads the status of the current position counter 102d, which counts the distributed pulses from the pulse distributor 103, and updates a current position GP within the memory 102b.

By thus executing steps (a) through (g), the feedrate of the electrode EP is controlled and electric discharge machining is carried out in such a manner that a prescribed gap is maintained between the electrode EP and workpiece WK.

When the gap between the electrode EP and workpiece WK becomes small and the gap voltage Vd falls below Vb (i.e., the limit value), retraction control is performed as will now be described.

In step (h) when the gap voltage V falls below Vb, the velocity P, namely the commanded velocity Pc, becomes negative, retraction control processing is commanded as the above-described step (f), and the processing unit 102c sets the control status CS in memory 102b to indicate that retraction is in progress.

In step (i) the processing unit 102c then calculates a deceleration starting point DSP, which occurs at the instant of readvance described below, from the current position GP in the memory 102b.

Step (j): Next, the processing unit 102c calculates a commanded velocity v (Pc') from Eq. (2), i.e., $$V = a \cdot k \cdot (Vb - Vd) \tag{3}$$
$$= Pc'$$

and stores the velocity in the memory 102b. The velocity is sent to the pulse distributor 103 to feed the electrode EP for retraction.

In step (k) the processing unit 102c updates the current position GP in memory 102b as well as a retraction distance l on the basis of the status of current position counter 102d (substeps k1, k2).

Step (l): Next, the processing unit 102c compares the retraction distance l in memory 102b with a retractable distance ld stored beforehand in the memory 102b. If the retraction distance l lies within the retractable distance ld, then the program returns to step (a).

From this point onward the retraction operation is in progress, so that P is zero.

Decision steps (m1) and (m2): At step (c) described above, the control status CS indicates that retraction is in progress. Therefore, the processing unit 102c determines whether the velocity P is positive or negative (decision step m1). If the velocity P is negative, this indicates that retraction control is in progress. P is therefore compared with the velocity Pc stored in the memory 102b (decision step m2). Since retraction is in progress, the velocities P, Pc are both negative, so that $|P|>|Pc|$ is indicated in terms of absolute values at Pc>P. Since P is greater in terms of absolute value, the velocity P stored in the memory 102b is updated to P. If Pc<P holds, i.e., if $|P|<|Pc|$ holds, then the velocity Pc stored in the memory 102b is used in subsequent retraction control. In other words, the maximum velocity at the time of retraction is employed in retraction control.

In step (n) the processing unit 102c next executes the aforementioned steps (j), (k), (l).

When the steps (a), (b), (c), (m) and (n) are executed in this manner to retract the electrode EP at the maximum velocity, the gap voltage Vd exceeds Vb (i.e., P is positive). As a result, readvance control is performed in the following manner.

In step (o) when P becomes positive during retraction, the processing unit 102c determines that P is positive in the above-described step (m) and sets the control status CS of memory 102b to indicate that readvance is in progress.

Step (p): Next, the processing unit 102c calculates the commanded velocity Pc' from Eq. (3) in the step (j) based on the maximum velocity $|Pc|$ during retraction, which is stored in the memory 102b, and delivers this velocity to the pulse distributor 103 to readvance the electrode EP.

In step (q) the processing unit 102c updates the current position GP in memory 102b based on the status of the current position counter 102d.

In decision step (r1) the processing unit 102c compares the deceleration starting point DSP, which was set in the memory 102b at step (i), and the current position Gp in memory 102b, and returns to the step (a) if the deceleration starting point DSP has not been reached.

Readvance control is thus performed by executing the steps (a), (b), (c), (m), (o), (p), (q) and (r1). When it is determined (decision step r1) that the deceleration starting point DSP has been reached due to readvance control, the processing unit 102c sets the control status CS in memory 102b to indicate that ordinary advance is in progress. As a result, the processing unit 102c executes steps (a) through (g) and restores the program to ordinary machining feed (step r2).

In step (s) when the retraction distance l surpasses the retractable distance ld at the step (1) during retraction control, namely when the gap voltage Vd does not exceed Vb even when the retractable distance ld is reached, the control status CS in memory 102b is set to indicate that the retraction alarm is in effect.

Steps (t1) and (t2): As a result, from this point onward, a retraction alarm signal is generated (step t2) as long as P is negative (decision step t1), and control of the electrode EP is no longer carried out. In other words, the fact that the gap voltage Vd does not rise even through full retraction is performed indicates that some malfunction has occurred. Control is therefore suspended and, if necessary, a warning is issued.

In step (u) if P becomes positive even while the retraction alarm is in effect, then the retraction alarm signal is turned off and the control status CS in memory 102b is set to indicate that readvance is in progress. Readvance control constituted by steps (p) through (r1 and r2) is executed from this point onward.

When the velocity commands Pc and Pc' from the processing unit 102c are applied to the pulse distributor 103, the latter executes a pulse distribution computation based on the commanded velocity and produces the distributed pulses Ps. Upon receiving the distributed pulses Ps, the accelerator/decelerator circuit 104 accelerates and decelerates the pulse rate thereof and applies the train of command pulses Pi to the error calculating and storing unit 107. Thus, the content of the error register 107b becomes non-zero, so that the DA converter 108 produces a voltage and the motor 105 is driven by the velocity control circuit 109 so as to move the electrode EP in the retracting or advancing direction. When the motor 105 has rotated by a predetermined amount, the feedback pulses FP are generated by the pulse coder 106 and applied to the error calculating and storing unit 107. The difference Er between the number of commanded pulses Pi and the number of feedback pulses FP is stored in the error register 17b. Thenceforth, servo control is performed while the difference Er is maintained constant in the steady state, and the electrode EP is fed as commanded and moved toward a target position.

Thus, according to the present invention, in an electric discharge machine for synchronously feeding an electrode on the basis of a gap voltage between an the electrode and a workpiece, a velocity obtained by multiplying a velocity determined from the gap voltage by a fixed multiplication factor is used as a retraction and readvance velocity in retraction control, and these velocities are maintained at a maximum velocity based on the minimum gap voltage. As a result, the retraction of the electrode can be controlled in a rapid manner. Accordingly, an arc discharge as well as collision between the electrode and workpiece can be prevented, thereby avoiding a deterioration in machined surface precision. Furthermore, by shortening the time needed for retraction control, a corresponding increase in overall machining speed can be achieved. In addition, the invention can be applied not only to electric discharge machines for machining shapes similar to that of the workpiece (sic), but also to other forms of electric discharge machines such as those of wire-cut type.

We claim:

1. An electrode retraction control system for retracting an electrode from a workpiece, comprising:
   electric discharge machine means for electric discharge machining by impressing a machining voltage across the electrode and the workpiece
   means for sensing a gap sensing voltage responsive to the machining voltage and for providing a first signal responsive to the gap sensing voltage;
   voltage sensing means, operatively connected to receive said first signal, for sensing when said first signal falls below a predetermined voltage and for providing a second signal responsive thereto;
   means for retracting the electrode in response to the second signal and in accordance with said gap sensing voltage and for subsequently readvancing the electrode, such that the electrode is retracted at a retraction velocity obtained by multiplying a velocity determined from said gap sensing voltage by a fixed multiplication factor, and said retraction velocity is maintained at a magnitude obtained by multiplying a velocity determined from a minimum value of said gap sensing voltage by a fixed multiplication factor.

2. An electrode retraction control system of an electric discharge machine according to claim 1, characterized in that a value obtained by subtracting a gap sensing voltage Vd from a limit voltage Vb is employed as a maximum value of the retraction velocity.

3. An electrode retraction control system for retracting an electrode from a workpiece, comprising:
   electric discharge machine means for electric discharge machining by impressing a machining voltage across the electrode and the workpiece;
   means for sensing a gap sensing voltage responsive to the machining voltage and for providing a first signal responsive to the gap sensing voltage;
   voltage sensing means, operatively connected to receive said first signal, for sensing when the gap sensing voltage falls below a predetermined voltage and for providing a second signal responsive thereto;
   means for retracting the electrode in response to the second signal and in accordance with said gap sensing voltage and for subsequently readvancing the electrode, such that the electrode is retracted and readvanced at a retraction velocity obtained by multiplying a velocity determined from said gap sensing voltage by a fixed multiplication factor, and said retraction velocity is maintained at a magnitude obtained by multiplying a velocity determined from a minimum value of said gap sensing voltage by a fixed multiplication factor.

4. An electrode retraction control system of an electric discharge machine according to claim 3, characterized in that a value obtained by subtracting a gap sensing voltage Vd from a limit voltage Vb is employed as a maximum value of the retraction velocity.

5. An electrode retraction control system for retracting an electrode from a workpiece in an electric discharge machine for electric discharge machining the workpiece by impressing a machining voltage across the electrode and the workpiece, the control system comprising:

means for sensing a gap sensing voltage responsive to the machining voltage and for providing a first signal responsive to the gap sensing voltage;

voltage sensing means for sensing when the gap sensing voltage falls below a predetermined value; and     retraction means for retracting the electrode in response to said second signal at a first velocity having a magnitude proportional to the magnitude of the first signal for a first portion of said retracting, and for retracting the electrode at a second velocity having a magnitude proportional to the maximum of the magnitude of the first velocity for the remaining portion of said retracting.

6. An electrode retraction control system according to claim 5, further comprising:

means for sensing and for providing a second signal when said first signal is greater than the predetermined value; and     means for reversing the velocity of the electrode in response to said second signal.

* * * * *

UNITED STATES PATENT AND TRADEMARK OFFICE
CERTIFICATE OF CORRECTION

PATENT NO. : 4,667,079

DATED : May 19, 1987

INVENTOR(S) : Matsumura et al.

It is certified that error appears in the above-identified patent and that said Letters Patent is hereby corrected as shown below:

```
Col. 2, line 24, "Summary of the Invention" should be
          --SUMMARY OF THE INVENTION--;
        line 62, "art," should be --art;--.

Col. 5, line 30, "statuc" should be --status--;
        line 31, "procesing" should be --processing--;
        line 51, "electrode)" should be --electrode--.

Col. 6, line 21, "l" should be --ℓ--;
        line 24, "l" should be --ℓ--;
        line 25, "ld" should be --ℓd--;
        line 26, "l" should be --ℓ--;
        line 27, "ld" should be --ℓd--;

Col. 7, line 16, "l" should be --ℓ--;
        line 17, "ld" should be --ℓd--;
        line 19, "ld" should be --ℓd--;
        line 61, delete "an".
```

Signed and Sealed this

Fifth Day of January, 1988

Attest:

DONALD J. QUIGG

Attesting Officer

Commissioner of Patents and Trademarks